US012083840B2

(12) United States Patent
Doman et al.

(10) Patent No.: US 12,083,840 B2
(45) Date of Patent: Sep. 10, 2024

(54) WEIGHT MEASURING HITCH BALL ASSEMBLY FOR MEASURING WEIGHT OF A TRAILER SUPPORTED BY A TOW VEHICLE

(71) Applicant: Weigh Safe, LLC, Lindon, UT (US)

(72) Inventors: Bryce Doman, Alpine, UT (US); Brandon Doman, Pleasant Grove, UT (US); Morgan McAllister, Lindon, UT (US)

(73) Assignee: Weigh Safe, LLC, Lindon, UT (US)

( * ) Notice: Subject to any disclaimer, the term of this patent is extended or adjusted under 35 U.S.C. 154(b) by 875 days.

(21) Appl. No.: 17/090,813

(22) Filed: Nov. 5, 2020

(65) Prior Publication Data

US 2021/0170819 A1 Jun. 10, 2021

Related U.S. Application Data

(63) Continuation-in-part of application No. 16/828,927, filed on Mar. 24, 2020, now abandoned, which is a
(Continued)

(51) Int. Cl.
*B60D 1/24* (2006.01)
*B60D 1/06* (2006.01)
(Continued)

(52) U.S. Cl.
CPC .............. *B60D 1/248* (2013.01); *B60D 1/06* (2013.01); *G01G 5/006* (2013.01); *G01G 19/02* (2013.01); *G01L 5/136* (2013.01)

(58) Field of Classification Search
CPC . B60D 1/248; B60D 1/06; B60D 1/62; G01G 5/006; G01G 19/02; G01G 19/52; G01G 19/08; G01L 5/136
See application file for complete search history.

(56) References Cited

U.S. PATENT DOCUMENTS 245,201 A 8/1881 Mills
665,017 A 1/1901 Klein
(Continued)

FOREIGN PATENT DOCUMENTS

DE 3612053 A1 10/1987
DE 10211572 A1 10/2003
(Continued)

OTHER PUBLICATIONS

PCT Search Report for application No. PCT/US2022/013566, mailing date May 6, 2022, 10 pages.

*Primary Examiner* — Kevin Hurley
*Assistant Examiner* — Marlon A Arce
(74) *Attorney, Agent, or Firm* — Thorpe North & Western, LLP; David W. Osborne

(57) ABSTRACT

A weight measuring hitch ball assembly is described. The assembly can include a hitch ball having a ball and a lower portion. The assembly can also include a body portion defining a hitch ball opening that slidably receives the lower portion of the hitch ball. The assembly can further include a load measurement device operably associated with the body portion and the hitch ball to determine a magnitude of a force acting on the hitch ball. Additionally, the assembly can include a retention coupling operable with the hitch ball and the body portion to secure the hitch ball to the body portion. The retention coupling can have a retention protrusion and a retention wall defining at least a portion of a retention opening operable to receive at least a portion of the retention protrusion therein. With the retention protrusion extending into the retention opening, the retention wall can provide a mechanical barrier to the retention protrusion that prevents removal of the hitch ball from the hitch ball opening. The retention opening can be configured to facilitate slidable movement of the hitch ball within the hitch ball opening (Continued)

sufficient to determine the magnitude of the force acting on the hitch ball.

20 Claims, 8 Drawing Sheets

Related U.S. Application Data continuation of application No. 15/493,068, filed on Apr. 20, 2017, now Pat. No. 10,596,869, which is a continuation-in-part of application No. PCT/US2016/021266, filed on Mar. 7, 2016, and a continuation-in-part of application No. 14/639,987, filed on Mar. 5, 2015, now Pat. No. 9,643,462, said application No. PCT/US2016/021266 is a continuation of application No. 14/639,987, filed on Mar. 5, 2015, now Pat. No. 9,643,462, which is a continuation-in-part of application No. 14/284,273, filed on May 21, 2014, now Pat. No. 9,327,566.

(60) Provisional application No. 62/931,108, filed on Nov. 5, 2019, provisional application No. 62/325,407, filed on Apr. 20, 2016, provisional application No. 62/249,730, filed on Nov. 2, 2015, provisional application No. 61/948,487, filed on Mar. 5, 2014, provisional application No. 61/948,456, filed on Mar. 5, 2014, provisional application No. 61/928,166, filed on Jan. 16, 2014, provisional application No. 61/826,247, filed on May 22, 2013.

(51) Int. Cl.
  G01G 5/00 (2006.01)
  G01G 19/02 (2006.01)
  G01L 5/13 (2006.01)

(56) References Cited

U.S. PATENT DOCUMENTS

| | | | |
|---|---|---|---|
| 2,363,307 | A | 11/1944 | Florschutz |
| 2,500,686 | A | 3/1950 | Jontz |
| 3,695,213 | A | 10/1972 | Littlefield |
| 3,700,053 | A | 10/1972 | Glissendorf |
| 3,797,594 | A | 3/1974 | Chaffee |
| 4,056,155 | A | 11/1977 | Wahl |
| 4,239,253 | A | 12/1980 | Golze |
| 4,286,669 | A | 9/1981 | Lasoen |
| 4,319,766 | A | 3/1982 | Corteg et al. |
| 4,522,421 | A | 6/1985 | Vance |
| 4,627,633 | A | 12/1986 | Gehman et al. |
| 4,996,770 | A | 3/1991 | McCracken |
| 5,040,817 | A | 8/1991 | Dunn |
| 5,116,072 | A | 5/1992 | Swenson |
| 5,280,941 | A | 1/1994 | Guhlin |
| 5,286,094 | A | 2/1994 | Milner |
| 5,290,057 | A | 3/1994 | Pellerito |
| 5,890,726 | A | 4/1999 | McCoy et al. |
| 6,053,521 | A | 4/2000 | Schertler |
| 6,142,500 | A | 11/2000 | Sargent |
| 6,253,626 | B1 | 7/2001 | Shoberg et al. |
| 6,270,107 | B1 | 8/2001 | Stoughton |
| 6,386,789 | B1 | 5/2002 | Chausse et al. |
| 6,494,478 | B1 | 12/2002 | MacKarvich |
| 6,629,701 | B1 | 10/2003 | Colibert |
| 6,722,684 | B1 | 4/2004 | McAllister |
| 6,829,943 | B2 | 12/2004 | Weyand et al. |
| 7,960,659 | B2 | 6/2011 | Cleary |
| 7,963,545 | B2 | 6/2011 | Coy |
| 8,033,563 | B2 | 10/2011 | Good |
| 8,226,107 | B2 | 7/2012 | Columbia |
| 8,276,932 | B2 | 10/2012 | Columbia |
| 8,371,603 | B2 | 2/2013 | Columbia |
| 8,376,387 | B2 | 2/2013 | Columbia |
| 8,380,390 | B2 | 2/2013 | Sy et al. |
| 8,534,695 | B2 | 9/2013 | Columbia |
| 8,840,130 | B2 | 9/2014 | Columbia |
| 8,939,462 | B2 | 1/2015 | Adamczyk et al. |
| 9,004,523 | B2 | 4/2015 | Scharf |
| 9,327,566 | B2 | 5/2016 | McAllister |
| 9,464,953 | B2 | 10/2016 | Wirthlin |
| 9,643,462 | B2 * | 5/2017 | McAllister ............ G01L 5/136 |
| 10,059,160 | B2 | 8/2018 | Ruiz et al. |
| 11,701,932 | B2 * | 7/2023 | McAllister ............ B60D 1/248 |
| | | | 177/136 |
| 2001/0045725 | A1 | 11/2001 | McCoy et al. |
| 2002/0140207 | A1 | 10/2002 | McCoy et al. |
| 2005/0283296 | A1 | 12/2005 | Viaud |
| 2006/0032679 | A1 * | 2/2006 | Wilson .................. G01G 19/02 |
| | | | 177/136 |
| 2006/0290102 | A1 * | 12/2006 | VanBuskirk, Jr. ........ B60D 1/58 |
| | | | 280/511 |
| 2009/0302574 | A1 | 12/2009 | Columbia |
| 2010/0181143 | A1 | 7/2010 | Bowden |
| 2011/0042154 | A1 | 2/2011 | Bartel |
| 2011/0259651 | A1 | 10/2011 | Cleary |
| 2012/0024081 | A1 | 2/2012 | Baker |
| 2012/0217726 | A1 | 8/2012 | Vortmeyer et al. |
| 2013/0038436 | A1 | 2/2013 | Brey et al. |
| 2013/0080078 | A1 | 3/2013 | Wirthlin |
| 2013/0253814 | A1 | 9/2013 | Wirthlin |
| 2014/0110918 | A1 * | 4/2014 | McCoy .................. B60D 1/488 |
| | | | 116/212 |
| 2014/0327229 | A1 * | 11/2014 | Scharf ...................... B60D 1/62 |
| | | | 177/136 |
| 2014/0339791 | A1 | 11/2014 | McCall et al. |
| 2016/0231165 | A1 | 8/2016 | Fredrickson |

FOREIGN PATENT DOCUMENTS

| | | |
|---|---|---|
| DE | 202011051374 U1 | 9/2011 |
| DE | 202011105552 U1 | 9/2012 |
| EP | 2363307 A2 | 9/2011 |
| WO | WO 2007/002278 A2 | 1/2007 |
| WO | WO 2017136483 A2 | 8/2017 |

* cited by examiner

WEIGHT MEASURING HITCH BALL ASSEMBLY FOR MEASURING WEIGHT OF A TRAILER SUPPORTED BY A TOW VEHICLE

PRIORITY DATA

This application is a continuation-in-part of U.S. patent application Ser. No. 16/828,927, filed Mar. 24, 2020, and also claims the benefit of U.S. Provisional Application Ser. No. 62/931,108 filed on Nov. 5, 2019, each of which is incorporated by reference. U.S. patent application Ser. No. 16/828,927, filed Mar. 24, 2020 is a continuation of U.S. patent application Ser. No. 15/493,068, filed Apr. 20, 2017, which claims the benefit of U.S. Provisional Application Ser. No. 62/325,407, filed on Apr. 20, 2016, which is incorporated by reference. U.S. patent application Ser. No. 15/493,068, filed Apr. 20, 2017 is also a continuation-in-part of PCT Application Serial No. PCT/US16/21266, filed on Mar. 7, 2016, which claims priority to U.S. patent application Ser. No. 14/639,987 filed on Mar. 5, 2015 and the benefit of U.S. Provisional Application Ser. No. 62/249,730 filed on Nov. 2, 2015, each of which is incorporated by reference. U.S. patent application Ser. No. 15/493,068, filed Apr. 20, 2017 is also a continuation-in-part of U.S. patent application Ser. No. 14/639,987 filed on Mar. 5, 2015, which is a continuation-in-part of U.S. patent application Ser. No. 14/284,273, filed on May 21, 2014, which claims the benefit of U.S. Provisional patent Application Ser. Nos. 61/826,247, filed on May 22, 2013, 61/928,166, filed on Jan. 16, 2014, 61/948,487, filed on Mar. 5, 2014, and 61/948,456, filed Mar. 5, 2014, each of which is incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the hitch or tongue weight (i.e., static downward force) that the trailer applies to the hitch of the tow vehicle. If the hitch or tongue of the trailer does not apply enough downward force to the tow vehicle hitch, a dangerous condition called trailer sway could result. If the hitch or tongue of the trailer applies too much downward force to the tow vehicle hitch, then the rear tires of the tow vehicle can be overloaded, thus pushing the rear of the vehicle around and compromising steering and/or braking of the tow vehicle. A generally acceptable tongue weight for a "bumper pull" trailer is somewhere between 9% and 15% of the gross trailer weight (GTW), and a generally acceptable hitch weight for a "bed mount" (e.g., gooseneck) trailer is somewhere between 15% and 25% of the GTW.

SUMMARY OF THE INVENTION

Weight measuring hitch ball assemblies are provided. In one embodiment, a weight measuring hitch ball assembly can include a hitch ball having a ball and a lower portion. The assembly can also include a body portion defining a hitch ball opening that slidably receives the lower portion of the hitch ball. The assembly can further include a load measurement device operably associated with the body portion and the hitch ball to determine a magnitude of a force acting on the hitch ball. Additionally, the assembly can include a retention coupling operable with the hitch ball and the body portion to secure the hitch ball to the body portion. The retention coupling can have a retention protrusion and a retention wall defining at least a portion of a retention opening operable to receive at least a portion of the retention protrusion therein. With the retention protrusion extending into the retention opening, the retention wall can provide a mechanical barrier to the retention protrusion that prevents removal of the hitch ball from the hitch ball opening. The retention opening can be configured to facilitate slidable movement of the hitch ball within the hitch ball opening sufficient to determine the magnitude of the force acting on the hitch ball.

In other embodiments, there are provided weight measuring hitch ball systems. In still other embodiments, there are provided methods of measuring weight of a trailer supported by a tow vehicle.

DETAILED DESCRIPTION OF THE INVENTION

Definitions

Figure 1:
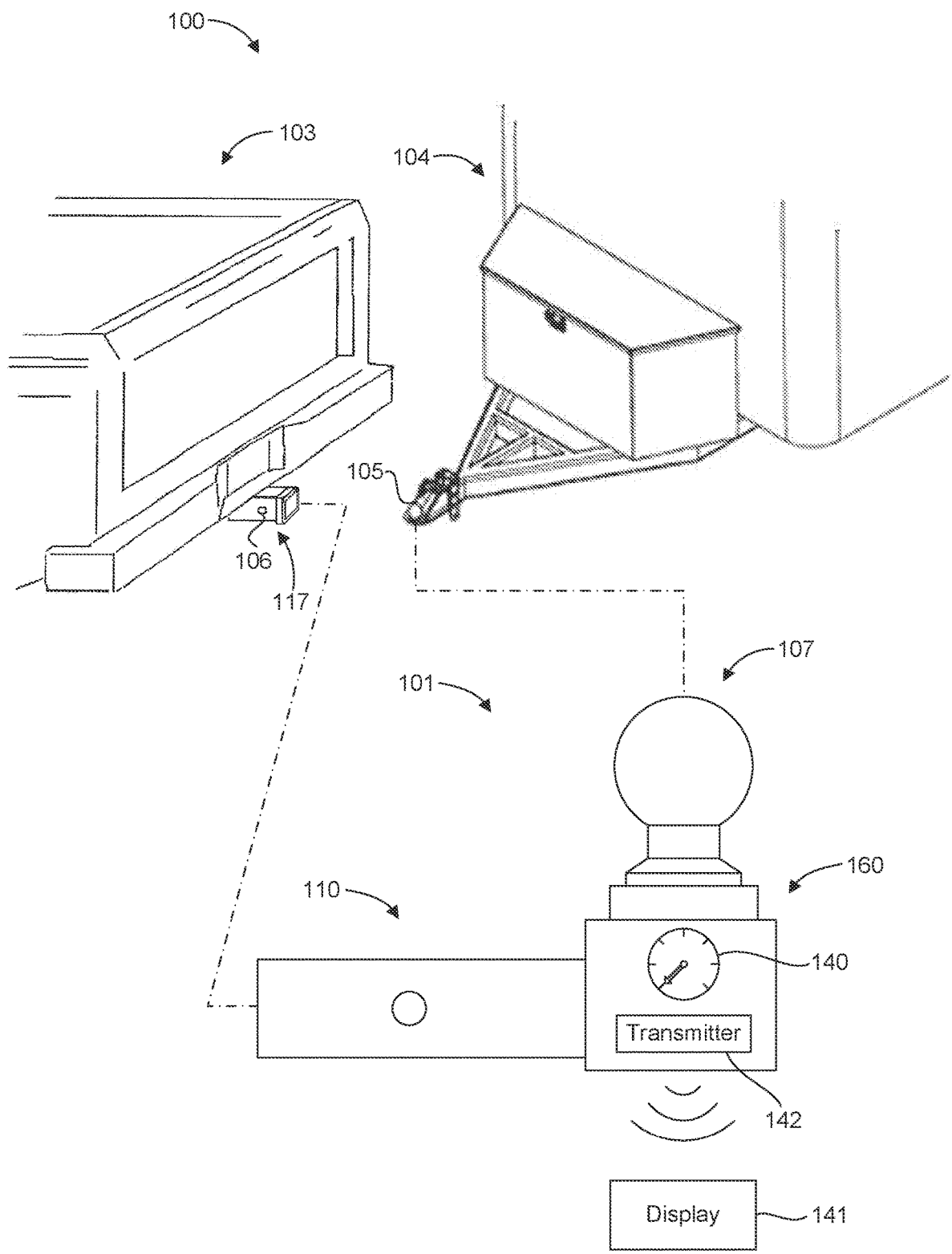
FIG. 1 illustrates a trailer hitch system for measuring tongue weight of a trailer, in accordance with an example of the present disclosure.

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

Figure 2:
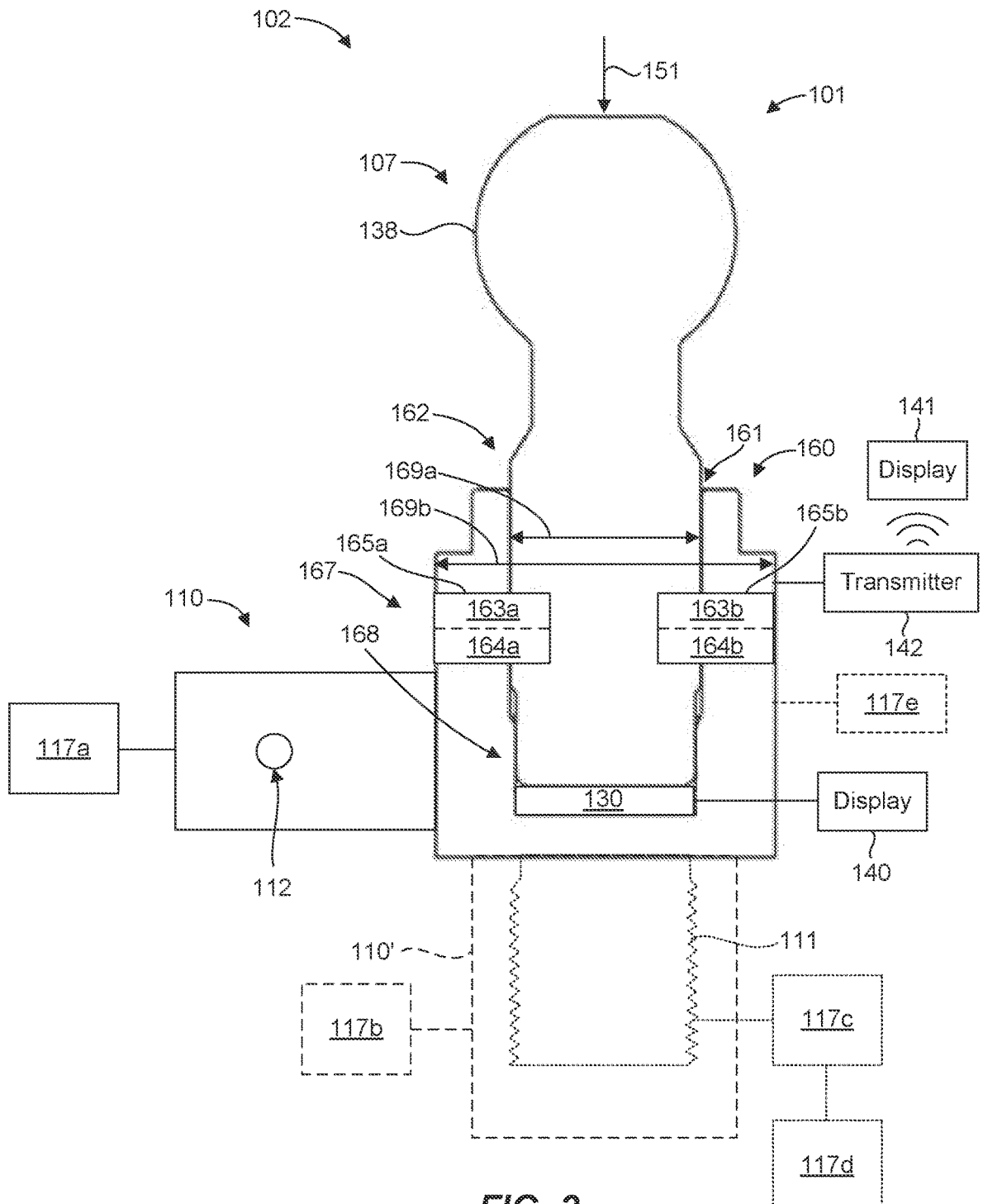
FIG. 2 is a schematic side cross-section view of a weight measuring hitch ball assembly of the trailer hitch system of FIG. 1, in accordance with an example of the present disclosure.

With reference to FIG. 1, illustrated is a trailer hitch system 100 for measuring hitch weight (e.g., ball weight, pin weight, or tongue weight) of a trailer, in accordance with an example of the present disclosure. In general, the trailer hitch system 100 can include a weight measuring hitch ball assembly 101 (or any other weight measuring hitch ball assembly disclosed herein) associated with a tow vehicle 103, and a trailer 104 operable to couple to the tow vehicle 103. A schematic illustration of the weight measuring hitch ball assembly 101 is shown in FIG. 2.

The weight measuring hitch ball assembly 101 can be included in a weight measuring hitch ball system 102, which can also include an attachment structure 117 operable to be associated with the tow vehicle 103 (FIG. 1) to facilitate coupling the weight measuring hitch ball assembly 101 to the tow vehicle 103. The attachment structure 117 is discussed in more detail below. The weight measuring hitch ball assembly 101 can include a hitch ball 107 (e.g., a goose ball, a ball mount, etc.) configured to engage with a coupling device 105 (FIG. 1) of the trailer 104 (e.g., a gooseneck, a tongue, etc.), and a load measurement device 130 (FIG. 2) operable to determine a magnitude of a downward force 151 acting on the hitch ball 107.

Although the trailer hitch system 100 includes what is generally referred to as a "hitch ball" throughout the present disclosure for coupling with a trailer, it should be recognized that the trailer hitch system can include any suitable form of coupling with a trailer, such as a lunette ring and pintle hook. Aspects of the present disclosure that facilitate measuring hitch weight of a trailer as disclosed herein can be incorporated into such coupling arrangements.

The weight measuring hitch ball assembly 101 can also include a support structure or body portion 160. The hitch ball 107 can include a ball 138 and a lower portion 162. The ball 138 can be configured to interface with the coupling device 105 of a trailer (e.g., a trailer tongue, gooseneck, etc.). The ball 138 and the lower portion 162 can be separate and distinct structures coupled to one another (i.e., rigidly and fixedly coupled) or the ball 138 and the lower portion 162 can form a single, monolithic structure. In either case, the hitch ball 107 can be a single structure comprised of multiple component parts or portions that remain in a fixed relationship to one another.

The load measurement device 130 can be operably associated with the body portion 160 and the hitch ball 107 to determine a magnitude of the force 151 acting on the hitch ball 107 (e.g., through the trailer interface with the ball 138). For example, the body portion 160 can include or define a hitch ball opening or socket 161 to slidably receive the lower portion 162 of the hitch ball 107. The hitch ball opening 161 can be configured to constrain translational movement of the hitch ball 107 to a single degree of freedom (i.e., parallel to the downward force 151), which can facilitate the hitch ball 107 exerting a force on the load measurement device 130.

The load measurement device 130 can comprise any suitable type of load measurement device or mechanism described herein. For example, the load measurement device 130 can comprise a load cell or transducer, such as a strain gage load cell, a mechanical load cell, a hydraulic load cell, and/or a pneumatic load cell, or any other suitable type of force and/or pressure sensor. In some examples, the load measurement device 130 can comprise a force gauge, such as a spring scale. In some embodiments, the load measurement device 130 can include a piston, a hydraulic medium (e.g., a fluid), and a pressure sensor or a load gauge as described in several examples hereinabove and hereinbelow. For instance, as described in other examples disclosed herein, the load measurement device 130 can include a fluid reservoir in fluid communication with a load gauge, and the fluid reservoir can comprise at least one of a hydraulic fluid or a pneumatic fluid. In one aspect, the lower portion of the hitch ball can act against a separate piston, which in turn acts on the fluid in the fluid reservoir as a means to determine the downward force 151 acting on the hitch ball. In another aspect, a bottom 168 of the lower portion 162 of the hitch ball 107 can form a piston operable to act on fluid in the fluid reservoir. In this case, the hitch ball may act directly on the fluid in the fluid reservoir, with no intermediate structures between the hitch ball and the fluid. Thus, the hitch ball 107 may be configured with an integrally formed piston to act on the fluid. In one aspect, the body portion 160 can define various features of the load measurement device 130 in addition to interfacing with and supporting the hitch ball 107. For example, the body portion 160 can form or define, at least in part, a fluid reservoir of the load measurement device 130.

In addition, the weight measuring hitch ball assembly 101 can include a display 140 for displaying or otherwise indicating force or load information obtained by the load measurement device 130. For example, the display 140 can be configured to indicate the magnitude of the downward force, as determined by the load measurement device 130.

Thus, the display 140 can be an analog and/or digital display of a sensor or load cell (e.g., a pressure gauge) located local to the load measurement device 130 and/or a separate display device distinct from the load measurement device 130 (e.g., a remote display associated with the tow vehicle and/or a mobile electronic device). The display 140 can be wired and/or wirelessly connected to the load measurement device 130. Thus, in one example, the weight measuring hitch ball assembly 101 can include a wireless transmitter 142, as described herein, to wirelessly transmit force measurements to a remote display 141.

In one aspect, the display 140 can be associated with the body portion 160, as shown in FIG. 2. The display 140 can be any suitable type of display, such as an analog or a digital display. The display 140 can be coupled to the load measurement device 130 in any suitable manner such that the display can properly indicate the magnitude of the load on the hitch ball 107. In one aspect, the display can be mechanically, electrically, hydraulically, and/or pneumatically coupled to the load measurement device 130. The load measurement device 130 and/or the display 140 can therefore include any suitable mechanical, electrical, hydraulic, and/or pneumatic device or mechanism that can facilitate the determination and/or display of the magnitude of the load on the hitch ball 107. For example, the load measurement device 130 and/or the display 140 can include a processor and/or memory to determine the magnitude of the load on the hitch ball 107. In one aspect, a mobile device, such as a smartphone or a tablet, can include a processor and/or memory used to determine the magnitude of the load on the hitch ball 107, such as by executing an application. In another aspect, the display 140 can be calibrated to indicate the magnitude of the load on the hitch ball 107, based on mechanical, electrical, hydraulic, and/or pneumatic input from the load measurement device 130. In a particular aspect, therefore, the display 140 can be integral with the load measurement device 130 in determining the magnitude of the load on the hitch ball 107.

In some examples, the weight measuring hitch ball assembly 101 can include a transmitter 142 such that load data pertaining to the magnitude of the downward force on the hitch ball 107 can be wired or wirelessly transmitted to the display 140. In one aspect, the transmitter can transmit load data to a location remote from the ball hitch, such as to a remote display 141. For example, the display 141 can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, the display 141 can comprise a screen of a mobile device, such as a smartphone or a tablet. Thus, the load data can be communicated to any suitable location, in or out of the vehicle. It should therefore be recognized that the display 140, 141 can be disposed in any suitable location and can be in communication with the load measurement device 130 via any suitable means. In one aspect, the load measurement device 130, the display 140, and/or the transmitter 150, or any other related item or device, such as a processor, memory, a battery, or a RF receiver, can be located in or on the weight measuring hitch ball assembly 101.

In one aspect, the weight measuring hitch ball assembly 101 of FIG. 2 can be configured to capture the hitch ball 107 to prevent the hitch ball from unwanted separation from the body portion 160. For example, the assembly 101 can include a retention coupling 167 operable with the hitch ball 107 and the body portion 160 to secure the hitch ball 107 to the body portion 160 while also facilitating slidable movement of the hitch ball 107 within the hitch ball opening 161 sufficient to determine the magnitude of the force 151 acting on the hitch ball 107. The retention coupling 167 can have a retention protrusion 164*a-b* and a retention wall 165*a-b* defining at least a portion of a retention opening 163*a-b* operable to receive at least a portion of the retention protrusion 164*a-b* therein. The retention wall 165*a-b*, the retention opening 163*a-b*, and the retention protrusion 164*a-b* are schematically represented in FIG. 2. The retention opening 163*a-b* can be associated with the hitch ball 107 (e.g., formed within the lower portion 162 of the hitch ball 107) and/or associated with the body portion 160 (e.g., formed within the body portion 160). The retention protrusion 164*a-b* can also be associated with the hitch ball 107 (e.g., coupled to the lower portion 162 of the hitch ball 107) and/or associated with the body portion 160 (e.g., coupled to the body portion 160). In one example, the retention protrusion 164*a-b* can be fastened, affixed, or otherwise associated with the hitch ball 107 (e.g., the lower portion 162) and the retention opening 163*a-b* can be formed in the body portion 160 (e.g., a through-hole in a sidewall of the body portion 160). With the retention protrusion 164*a-b* extending into the retention opening 163*a-b*, the retention wall 165*a-b* can provide a mechanical barrier to the retention protrusion 164*a-b* that prevents removal of the hitch ball 107 from the hitch ball opening 161. The retention wall 165*a-b* can be of any suitable shape, geometry, or configuration to provide or define a suitable retention opening 163*a-b*. In some examples, one or more of the retention openings 163*a-b* can be configured as a recess, a through opening (e.g., a through-hole), a blind opening (e.g., a blind-hole), etc. Similarly, one or more of the retention protrusions 164*a-b* can be of any suitable shape, geometry, or configuration to facilitate extension into at least a portion of a retention opening as disclosed herein.

In one example, each of the retention openings 163*a-b* can receive at least one of the retention protrusions 164*a-b* to secure the hitch ball 107 to the body portion 160. For example, the retention protrusions 164*a-b* can extend into the respective retention openings 163*a-b*. The retention openings 163*a-b* and the retention protrusions 164*a-b* can be configured to facilitate movement of the hitch ball 107 against the load measurement device 130 in response to the downward force 151 on the hitch ball. For example, an upper clearance between the retention protrusions 164*a-b* and retention walls 165*a-b* of the retention openings 163*a-b* can be sized equal to or greater than a range of motion of the load measurement device 130 (e.g., maximum deflection or piston travel) in response to a maximum allowable force 151 applied to the hitch ball 107. This can ensure that the retention protrusions 164*a-b* will not hinder downward movement of the hitch ball 107, which could interfere with a proper measurement of the downward force 151 on the hitch ball 107. The shapes and/or sizes of the retention protrusions 164*a-b* and the retention openings 163*a-b* can be of any suitable configuration (e.g., cross-sectional shapes that are circular, oval, elliptical, rectangular, etc.), structure (e.g., a notch, groove, channel, hole, etc.), or dimension. For example, the retention protrusions 164*a-b* can comprise at least one of a pin, a bolt, a screw, a rod, a shaft, a stud, a shoulder bolt, a tab, a flange, or a ball. In addition, the retention openings 163*a-b* and the retention protrusions 164*a-b* can be included in any suitable quantity and in any suitable location or pattern. In one example, the retention protrusions 164*a-b* and the retention openings 163*a-b* can include similar features (e.g., a ball and opening) found in the securing mechanism shown in FIGS. 4A and 4B and described below.

In one aspect, one or more of the retention protrusions 164*a-b* can extend into one or more of the retention openings 163*a-b* and one or more ends of the retention protrusions 164*a-b* can terminate within one or more of the retention openings 163*a-b* (e.g., within the lower portion 162 of the hitch ball 107 or within the body portion 160). In other words, the retention protrusions 164*a-b* do not extend all the way through the hitch ball 107 (e.g., through the lower portion 162) or the body portion 160, as applicable. In a particular aspect, one or more of the retention openings 163*a-b* can be blind openings or holes (e.g., openings or holes that do not extend all the way through the lower portion 162 of the hitch ball 107 or the body portion 160). Thus, one or more of the retention openings 163*a-b* can be blind openings or through openings and the retention protrusions 164*a-b* may not extend all the way through the hitch ball 107 or body portion 160.

In one aspect, the lower portion 162 of the hitch ball 107 and the body portion 160 can have a dimensional relationship that results in a relatively "thin-walled" body portion 160 forming the hitch ball opening 161 and surrounding the lower portion 162 of the hitch ball 107. Thus, in some examples, an outer dimension 169*a* of the lower portion 162 of the hitch ball 107 can be greater than or equal to 50% of an outer dimension 169*b* of the body portion 160 about the lower portion 162 of the hitch ball 107.

The weight measuring hitch ball assembly 101 can be adapted to serve as a hitch ball or ball mount for a variety of different hitch configurations. Variations of the attachment structure 117 are illustrated as attachment structures 117*a-e* in FIG. 2. For example, the attachment structure 117*a* can be any typical horizontally-oriented hitch receiver, such as a standard 2½", 2", or 1¼" size square hitch receiver for receiving hitch components (e.g., drawbars) for "bumper pull" style hitches. In other examples, an attachment structure 117*b* can be any typical vertically-oriented hitch receiver, such as a square hitch receiver (typically aftermarket) or a round hitch receiver (typically OEM) for receiving bed-mount style hitches (e.g., gooseneck hitches). In one example, the weight measuring hitch ball assembly 101 can include a coupling feature 111 operable to couple the hitch ball assembly 101 to an attachment structure 117*c* (e.g., a draw bar) that facilitates coupling the assembly 101 to the tow vehicle 103. In this case, the attachment structure 117*c* can be configured to interface with an attachment structure 117*d* (e.g., a hitch receiver) attached to a tow vehicle. In another example, the attachment structure 117*e* can be a hitch or hitch portion (e.g., an above-bed attachment structure, such as an above-bed gooseneck hitch system) that attaches to a tow vehicle. In one aspect, the attachment structures 117*a-e* can be a portion of the tow vehicle 103, such that the assembly 101 is coupled directly to the tow vehicle 103. The coupling feature 111 can be or include any suitable coupling configuration known in the art, such as a threaded coupling feature (e.g., external threads or internal threads), a shaft, a rod, a hole, a recess, a groove, a pin, or any other feature suitable for coupling the assembly 101 to an attachment structure and/or a tow vehicle and maintaining structural integrity during towing. In one aspect, the coupling feature 111 can extend downward from the body portion 160 below the hitch ball 107, although any other suitable location and/or orientation of the coupling feature 111 is contemplated.

One benefit of the coupling feature 111 is that it enables the weight measuring hitch ball assembly 101 to be removably coupled to a given attachment structure 117a-e (e.g., a hitch or hitch portion, drawbar, hitch receiver, etc.) that is operable to facilitate coupling the assembly 101 to the tow vehicle 103. As will be apparent to one skilled in the art, coupling devices of trailers (e.g., goosenecks, trailer tongues, etc.) have a variety of sizes and can require differing hitch ball sizes to securely couple a trailer to a towing vehicle. Some standard hitch ball sizes can include 1⅞", 2", 2 5/16", and 3" diameters. Thus, an assembly 101 having a suitable ball 138 size can be selected for coupling with a given attachment structure 117a-e (e.g., a hitch or hitch portion, drawbar, hitch receiver, etc.) to accommodate a given size/configuration of trailer coupling device.

In one example, the body portion 160 can be configured to interface directly with the attachment structure 117e associated with a tow vehicle that facilitates coupling the weight measuring hitch ball assembly 101 to the tow vehicle. In another example, the weight measuring hitch ball assembly 101 can include a hitch portion 110, 110' configured to interface with the attachment structure 117a, 117b, respectively, associated with a tow vehicle that facilitates coupling the weight measuring hitch ball assembly 101 to the tow vehicle. In one example, the hitch portion 110 extends laterally from the body portion 160 on a lateral side of the hitch ball 107. In this case, the attachment structure 117a can comprise a hitch receiver. The hitch portion 110 can include a hole 112 or other suitable feature to facilitate securing the weight measuring hitch ball assembly 101 to the attachment structure 117a, such as with a pin or threaded fastener through the hole 112 of the assembly 101 and a hole 106 of the attachment structure 117a. In another example, the hitch portion 110' can be configured to interface with the attachment structure 117b associated with a tow vehicle that facilitates coupling the weight measuring hitch ball assembly 101 to the tow vehicle. In this example, the hitch portion 110' extends downward from the body portion 160 below the hitch ball 107. In this case, the attachment structure 117b can comprise a goose ball receiver socket mounted on or otherwise associated with a tow vehicle. In the above examples, the hitch portions 110, 110' can be permanently attached (e.g., integrally formed) with the body portion 160 or removably coupled to the body portion 160.

A method of measuring weight of a trailer supported by a tow vehicle can comprise operably coupling a weight measuring hitch ball assembly as disclosed herein (e.g., the weight measuring hitch ball assembly 101) to a tow vehicle. The method can also include engaging a coupling device of a trailer with the weight measuring hitch ball assembly.

The weight measuring hitch ball assembly 101 of FIGS. 1 and 2 has been shown and described as a generic representation of such an assembly. FIGS. 3-8B include illustrations of various weight measuring hitch ball assemblies that are more specific examples of the generic assembly 101 of FIGS. 1 and 2. Thus, the description of the assembly 101 in FIGS. 1 and 2 may describe aspects of the various assemblies of FIGS. 3-8B, as applicable, which may not be described with particular reference to FIGS. 3-8B. Furthermore, certain specific aspects and features described in one example may be present in another example, although not specifically discussed with reference to that example.

Figure 3:
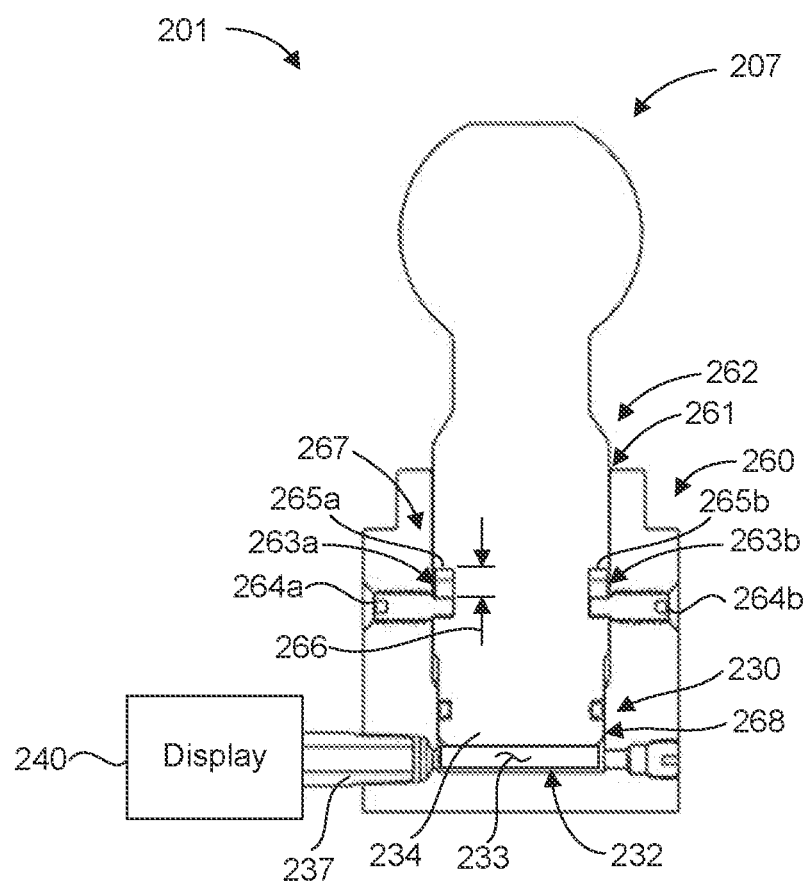
FIG. 3 is a schematic side cross-section view of a weight measuring hitch ball assembly in accordance with an example of the present disclosure.

FIG. 3 illustrates a weight measuring hitch ball assembly 201 in accordance with an example of the present disclosure. The weight measuring hitch ball assembly 201 can include a hitch ball 207 configured to engage with a coupling device of the trailer, a load measurement device 230 operable to determine a magnitude of a downward force 251 acting on the hitch ball 207, and a support structure or body portion 260 in support of the hitch ball 207. The body portion 260 can include or define a hitch ball opening or socket 261 to slidably receive a lower portion 262 of the hitch ball 207. The load measurement device 230 can comprise any suitable type of load measurement device or mechanism described herein.

In the illustrated example, the load measurement device 230 includes a reservoir 232 having a fluid 233 and a piston 234 disposed therein. In this case, the piston 234 is integrally formed with a hitch ball 207 (e.g., a bottom 268 of a lower end 262 of the hitch ball 207 forms the piston 234). The piston 234 can affect a pressure of the fluid 233 as a result of a downward force on the hitch ball 207. The load measurement device 230 also includes a pressure sensor 236, or gauge, in fluid communication with the reservoir 232, such as via a conduit 237, to indicate a quantity of the downward force acting on the hitch ball 207 based on the pressure of the fluid. The pressure sensor 236 can be calibrated to indicate the force acting on the hitch ball 207.

In one aspect, a display 240 for the pressure sensor or gauge can be included to indicate the magnitude of the load or downward force acting on the hitch ball 207. Such a display can be located proximate a pressure sensor or included with a gauge. It should be recognized that a pressure sensor, a gauge, or a display can be disposed in any suitable location. For example, as shown in FIG. 3, a pressure sensor and associated display 240 can be located at a distance from the body portion 260. In this case, the pressure sensor can be in fluid communication with the fluid reservoir via the conduit 237 external to the body portion 260. In one aspect, multiple pressure sensors and/or displays can be utilized to present force information in various directions and/or locations.

The assembly 201 can be configured to capture the hitch ball 207 to prevent the hitch ball from unwanted separation from the body portion 260. For example, as shown in FIG. 3, the assembly 201 can include a retention coupling 267 that secures the hitch ball 207 to the body portion 260 while also facilitating slidable movement of the hitch ball 207 within a hitch ball opening 261 of the body portion 260 to determine the magnitude of a force acting on the hitch ball 207. The retention coupling 267 can have a retention protrusion 264a-b and a retention wall 265a-b defining at least a portion of a retention opening 263a-b operable to receive at least a portion of the retention protrusion 264a-b therein. The retention wall 265a-b can provide a mechanical barrier to the retention protrusion 264a-b that prevents removal of the hitch ball 207 from the hitch ball opening 261.

In the illustrated example, one or more of the retention openings 263a-b is associated with the hitch ball 207 (e.g., formed within the lower portion 262 of the hitch ball 207). In addition, one or more of the retention protrusions 264a-b is associated with the body portion 260 (e.g., coupled to the body portion 260). As shown in the illustrated example, the retention protrusions 264a-b can be threadingly engaged with the body portion. Each of the retention openings 263a-b can receive at least one of the retention protrusions 264*a-b* to secure the hitch ball 207 to the body portion 260. For example, the retention protrusions 264*a-b* can extend into the respective retention openings 263*a-b*. The retention openings 263*a-b* and the retention protrusions 264*a-b* can be configured to facilitate movement of the hitch ball 207 against the load measurement device 230 in response to the downward force 251 on the hitch ball. For example, an upper clearance 266 between the retention protrusions 264*a-b* and the retention walls 265*a-b* of the retention openings 263*a-b* can be sized equal to or greater than a range of motion of the load measurement device 230 (e.g., maximum deflection or piston travel) in response to a maximum allowable force 251 applied to the hitch ball 207. This can ensure that the retention protrusions 264*a-b* will not hinder downward movement of the hitch ball 207, which could interfere with a proper measurement of the downward force 251 on the hitch ball 207. The shapes and/or sizes of the retention protrusions 264*a-b* and the retention openings 263*a-b* can be of any suitable configuration (e.g., cross-sectional shapes that are circular, oval, elliptical, rectangular, etc.), structure (e.g., a notch, groove, channel, hole, etc.), or dimension. For example, the retention protrusions 264*a-b* can comprise at least one of a pin, a bolt, a screw, a rod, a shaft, a tab, a flange, or a ball. In addition, the retention openings 263*a-b* and the retention protrusions 264*a-b* can be included in any suitable quantity and in any suitable location or pattern.

The retention protrusions 264*a-b* and retention openings 263*a-b* can have any suitable relationship with the associated hitch ball 207 and body portion 260. In one aspect, as shown in FIG. 3, one or more of the retention protrusions 264*a-b* (and/or retention openings 263*a-b*) can be oriented toward a center of the hitch ball 207. In another aspect, at least two retention protrusions 264*a-b* (and/or retention openings 263*a-b*) can be oriented parallel to one another. In a particular aspect, at least two of the retention protrusions 264*a-b* (and/or retention openings 263*a-b*) can be aligned with one another.

In one aspect, ends of the retention protrusions 264*a-b* can terminate within the retention openings 263*a-b* (e.g., within the lower portion 262 of the hitch ball 207). In other words, the retention protrusions 264*a-b* do not extend all the way through the hitch ball 207 (e.g., through the lower portion 262). In a particular aspect, one or more of the retention openings 263*a-b* can be blind openings or holes (e.g., openings or holes that do not extend all the way through the lower portion 262 of the hitch ball 207). Thus, one or more of the retention openings 263*a-b* can be blind openings or through openings and the retention protrusions 264*a-b* may not extend all the way through the hitch ball 207.

Although the retention openings 263*a-b* have been shown and described as being associated with the hitch ball 207 and the retention protrusions 264*a-b* have been shown and described as being associated with the body portion 260, it should be recognized that retention openings and retention protrusions can be associated with a hitch ball and/or a body portion, in any suitable arrangement or combination, as desired. For example, retention openings can be associated with a body portion, and retention protrusions can be associated with a hitch ball (e.g., coupled to the hitch ball, such as threadingly engaged with the hitch ball). In another example, retention openings and retention protrusions can be associated with both a hitch ball and a body portion.

Figure 4A:
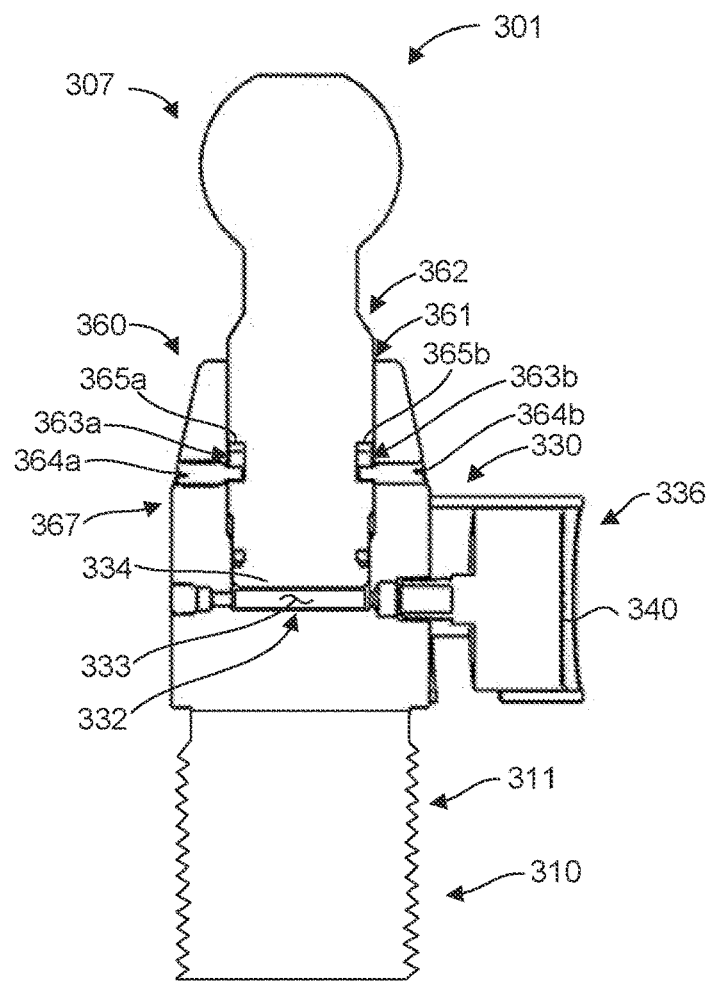
FIG. 4A is a schematic side cross-section view of a weight measuring hitch ball assembly in accordance with an example of the present disclosure.
Figure 4B:
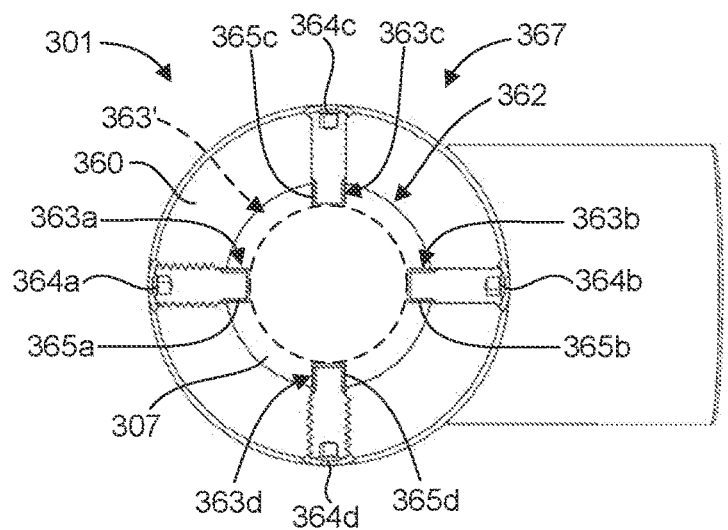
FIG. 4B is a schematic top cross-section view of the weight measuring hitch ball assembly of FIG. 4A, in accordance with an example of the present disclosure.

FIGS. 4A and 4B illustrate a weight measuring hitch ball assembly 301 in accordance with an example of the present disclosure. The weight measuring hitch ball assembly 301 can include a hitch ball 307 configured to engage with a coupling device of the trailer, a load measurement device 330 operable to determine a magnitude of a downward force acting on the hitch ball 307, and a support structure or body portion 360 in support of the hitch ball 307. The body portion 360 can include or define a hitch ball opening or socket 361 to slidably receive a lower portion 362 of the hitch ball 307.

The load measurement device 330 can comprise any suitable type of load measurement device or mechanism described herein. As with the assembly 201 of FIG. 3 discussed above, in this particular example, the assembly 301 of FIGS. 4A and 4B includes a load measurement device 330 with a reservoir 332 having a fluid 333 and a piston 334 integrated with a hitch ball 307 disposed in the reservoir 332, as shown in FIG. 4A. In this case, a pressure sensor 336, or gauge, and associated display 340 are located on, or mounted to, a body portion 360.

The assembly 301 also includes a hitch portion 310 configured to interface with an attachment structure associated with a tow vehicle that facilitates coupling the hitch ball assembly 301 to the tow vehicle. In this example, the hitch portion 310 extends downward from the body portion 360 below a hitch ball 307. In this case, the hitch portion 310 can include a coupling feature 311 operable to couple the hitch ball assembly 301 to an attachment structure, as described herein (e.g., a draw bar), which facilitates coupling the assembly 301 to a tow vehicle. The coupling feature 311 can be or include any suitable coupling configuration known in the art, such as a threaded coupling feature (e.g., external threads or internal threads), a shaft, a rod, a hole, a recess, a groove, a pin, or any other feature suitable for coupling the assembly 301 to an attachment structure and/or a tow vehicle and maintaining structural integrity during towing. Although the coupling feature 311 is illustrated as extending downward from the body portion 360 below the hitch ball 307, any other suitable location and/or orientation of the coupling feature 111 is contemplated.

The assembly 301 can be configured to capture the hitch ball 307 to prevent the hitch ball from unwanted separation from the body portion 360. For example, as shown in FIGS. 4A and 4B, the assembly 301 can include a retention coupling 367 that secures the hitch ball 307 to the body portion 360 while also facilitating slidable movement of the hitch ball 307 within a hitch ball opening 361 of the body portion 360 to determine the magnitude of a force acting on the hitch ball 307. The retention coupling 367 can have a retention protrusion 364*a-d* and a retention wall 365*a-d* defining at least a portion of a retention opening 363*a-d* operable to receive at least a portion of the retention protrusion 364*a-d* therein. The retention wall 365*a-d* can provide a mechanical barrier to the retention protrusion 364*a-d* that prevents removal of the hitch ball 307 from the hitch ball opening 361.

In the illustrated example, one or more of the retention openings 363*a-d* is associated with the hitch ball 307 (e.g., formed within the lower portion 362 of the hitch ball 307). In addition, one or more of the retention protrusions 364*a-d* is associated with the body portion 360 (e.g., coupled to the body portion 360). As shown in the illustrated example, the retention protrusions 364*a-d* can be threadingly engaged with the body portion. Each of the retention openings 363*a-d* can receive at least one of the retention protrusions 364*a-d* to secure the hitch ball 307 to the body portion 360. For example, the retention protrusions 364*a-d* can extend into the respective retention openings 363*a-d*. The retention openings 363*a-d* and the retention protrusions 364*a-d* can be configured to facilitate movement of the hitch ball 307 against the load measurement device 330 in response to the downward force on the hitch ball. For example, an upper clearance between the retention protrusions 364a-d and the retention walls 365a-d of the retention openings 363a-d can be sized equal to or greater than a range of motion of the load measurement device 330 (e.g., maximum deflection or piston travel) in response to a maximum allowable force applied to the hitch ball 307. This can ensure that the retention protrusions 364a-d will not hinder downward movement of the hitch ball 307, which could interfere with a proper measurement of the downward force on the hitch ball 307. The shapes and/or sizes of the retention protrusions 364a-d and the retention openings 363a-d can be of any suitable configuration (e.g., cross-sectional shapes that are circular, oval, elliptical, rectangular, etc.), structure (e.g., a notch, groove, channel, hole, etc.), or dimension. For example, the retention protrusions 364a-d can comprise at least one of a pin, a bolt, a screw, a rod, a shaft, a tab, a flange, or a ball. In addition, the retention openings 363a-d and the retention protrusions 364a-d can be included in any suitable quantity and in any suitable location or pattern.

The retention protrusions 364a-d and retention openings 363a-d can have any suitable relationship with the associated hitch ball 307 and body portion 360. The top cross-sectional view of FIG. 4B further illustrates an arrangement of retention openings 363a-d and the retention protrusions 364a-d that serve to secure the hitch ball 307 to the body portion 360. In this case, four retention protrusions 364a-d extend into four respective retention openings 363a-d, which are equally spaced about the circumference of the body portion 360 and the hitch ball 307, although any suitable configuration may be utilized. As further shown in the FIG. 4B example, one or more of the retention protrusions 364a-d (and/or retention openings 363a-d) can be oriented toward a center of the hitch ball 307. In one aspect, at least two retention protrusions 364a-b, 364c-d (and/or retention openings 363a-b, 363c-d) can be oriented parallel to one another. In a particular aspect, at least two of the retention protrusions 364a-b, 364c-d (and/or retention openings 363a-b, 363c-d) can be aligned with one another. In yet another aspect, at least two of the retention protrusions 364a-b can be oriented perpendicular relative to retention protrusions 364c-d (and/or retention openings 363a-b relative to retention openings 363c-d). In one aspect, a retention opening 363' can extend about an outer periphery of the lower portion 362. In this case, one or more of the retention protrusions 364a-d can extend into the (single) retention opening 363'. Such a configuration can enable relative rotation between the hitch ball 307 and the body portion 360.

In one aspect, ends of the retention protrusions 364a-d can terminate within the retention openings 363a-d (e.g., within the lower portion 362 of the hitch ball 307). In other words, the retention protrusions 364a-d do not extend all the way through the hitch ball 307 (e.g., through the lower portion 362). In a particular aspect, one or more of the retention openings 363a-d can be blind openings or holes (e.g., openings or holes that do not extend all the way through the lower portion 362 of the hitch ball 307). Thus, one or more of the retention openings 363a-d can be blind openings or through openings and the retention protrusions 364a-d may not extend all the way through the hitch ball 307. Although the retention openings 363a-d have been shown and described as being associated with the hitch ball 307 and the retention protrusions 364a-d have been shown and described as being associated with the body portion 360, it should be recognized that retention openings and retention protrusions can be associated with a hitch ball and/or a body portion, in any suitable arrangement or combination, as desired. For example, retention openings can be associated with a body portion, and retention protrusions can be associated with a hitch ball (e.g., coupled to the hitch ball, such as threadingly engaged with the hitch ball). In another example, retention openings and retention protrusions can be associated with both a hitch ball and a body portion.

Figure 5:
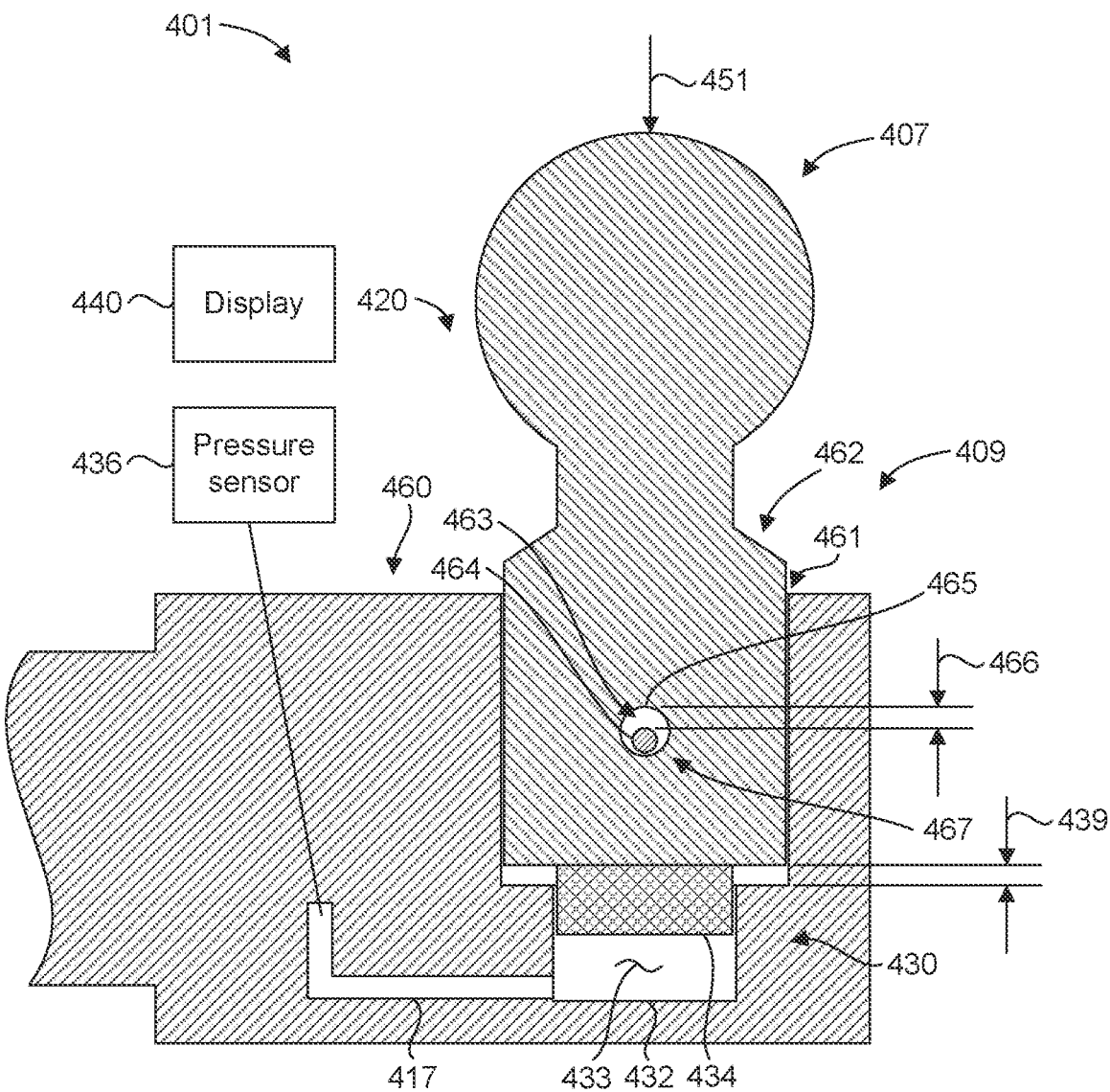
FIG. 5 is a schematic side cross-section view of a weight measuring hitch ball assembly in accordance with an example of the present disclosure.

FIG. 5 illustrates a weight measuring hitch ball assembly 401, in accordance with another example of the present disclosure. The weight measuring hitch ball assembly 401 can include a hitch ball 407 configured to engage with a coupling device of the trailer, a load measurement device 430 operable to determine a magnitude of a downward force 451 acting on the hitch ball 407, and a support structure or body portion 460 in support of the hitch ball 407. The body portion 460 can include or define a hitch ball opening or socket 461 to slidably receive a lower portion 462 of the hitch ball 407. The assembly 401 also includes a hitch portion 410 for interfacing with a hitch receiver associated with a vehicle, and a ball portion 420, which can include the hitch ball 407 and the body portion 460.

The load measurement device 430 can comprise any suitable type of load measurement device or mechanism described herein. In the illustrated example, the load measurement device 430 includes a reservoir 432 having a fluid 433 and a piston 434 disposed therein. The piston 434 can affect a pressure of the fluid 433 as a result of the downward load 451 on the hitch ball 407. The load measurement device 430 also includes a pressure sensor 436, or gauge, in fluid communication with the reservoir 432, such as via a conduit 417, to indicate a quantity of the downward load 451 based on the pressure of the fluid. The pressure sensor 436 can be calibrated to indicate a load acting on the hitch ball 407.

In the present embodiment, the load measurement device 430 is associated with the ball portion 420. In one aspect, the assembly 401 includes a trailer tongue weight measuring portion 409 that includes the hitch ball 407 and the load measurement device 430. The hitch ball 407 and the piston 434 are rigidly and mechanically coupled to one another, such that movement of the hitch ball 407 directly causes movement of the piston 434. Thus, the hitch ball 407 is configured to exert a force on the piston 434, thereby affecting a pressure of the fluid 433 in response to the downward force 451 on the hitch ball 407. In other words, the hitch ball 407 can be configured to move as a result of the load and cause the piston 434 to increase pressure of the fluid 433.

The body portion 460 can define various features of the load measurement device 430 and can interface with and support the hitch ball 407. For example, the body portion 460 can define, at least in part, the reservoir 432 and/or the conduit 417. As mentioned above, the body portion 460 can also have a hitch ball opening 461 to receive a lower portion 462 of the hitch ball 407 and facilitate the hitch ball 407 exerting a force on the piston 434. The hitch ball opening 461 can be configured to constrain translational movement of the hitch ball 407 to a single degree of freedom (i.e., parallel to the downward force 451), which can facilitate the hitch ball 407 exerting a force on the piston 434.

In one aspect, a display 440 for the pressure sensor or gauge can be included to indicate the magnitude of the load or downward force 451. Such a display can be located proximate the pressure sensor 436 or included with a gauge. It should be recognized that a display can be disposed in any suitable location and can be in communication with the pressure sensor via any suitable means. For example, the display 440 can be associated with the ball portion 420. In another example, a transmitter can be included to communicate the magnitude of the downward force 451 on the hitch ball 407 to a remote display.

The assembly 401 can be configured to capture the hitch ball 407 to prevent the hitch ball from unwanted separation from the body portion 460. For example, as shown in FIG. 5, the assembly 401 can include a retention coupling 467 that secures the hitch ball 407 to the body portion 460 while also facilitating slidable movement of the hitch ball 407 within a hitch ball opening 461 of the body portion 460 to determine the magnitude of a force acting on the hitch ball 407. The retention coupling 467 can have a retention protrusion 464 and a retention wall 465 defining at least a portion of a retention opening 463 operable to receive at least a portion of the retention protrusion 464 therein. The retention wall 465 can provide a mechanical barrier to the retention protrusion 464 that prevents removal of the hitch ball 407 from the hitch ball opening 461.

In the illustrated example, the retention opening 463 is associated with the hitch ball 407 (e.g., formed within the lower portion 462 of the hitch ball 407). In one aspect, the retention protrusion 464 can be associated with the body portion 460 (e.g., coupled to the body portion 460). The retention opening 463 can receive the retention protrusion 464 to secure the hitch ball 407 to the body portion 460. For example, the retention protrusion 464 can extend into the retention opening 463. The retention opening 463 and the retention protrusion 464 can be configured to facilitate movement of the hitch ball 407 against the load measurement device 430 in response to the downward force 451 on the hitch ball. For example, an upper clearance 466 between the retention protrusion 464 and the retention wall 465 of the retention opening 463 can be sized equal to or greater than a range of motion or extension distance 439 of the load measurement device 430 (e.g., maximum deflection or piston travel) in response to a maximum allowable force 451 applied to the hitch ball 407. This can ensure that the retention protrusion 464 will not hinder downward movement of the hitch ball 407, which could interfere with a proper measurement of the downward force 451 on the hitch ball 407. The shapes and/or sizes of the retention protrusion 464 and the retention opening 463 can be of any suitable configuration (e.g., cross-sectional shapes that are circular, oval, elliptical, rectangular, etc.), structure (e.g., a notch, groove, channel, hole, etc.), or dimension. For example, the retention protrusion 464 can comprise at least one of a pin, a bolt, a screw, a rod, a shaft, a tab, a flange, or a ball.

In one aspect, the retention protrusion 464 and retention opening 463 can have any suitable relationship with the associated hitch ball 407 and body portion 460. In one aspect, as shown in FIG. 5, the retention protrusion 464 (and/or retention opening 463) can be oriented toward a center of the hitch ball 407. In addition, the retention opening 463 and the retention protrusion 464 can be in any suitable location. Thus, although the location of the retention opening 463 and the retention protrusion 464 are shown in the figure as being laterally located in a middle portion of the hitch ball 407, it should be recognized that a retention opening and a retention protrusion can be located at a lateral external surface of the hitch ball 407, such as proximate a wall of the hitch ball opening 461 (see, e.g., FIGS. 8A and 8B). In one aspect, the retention protrusion 464 can be accessible from an exterior of the body portion 460 to facilitate removal of the retention protrusion and, thus, the hitch ball 407. The hitch ball 407 can therefore be interchanged with another hitch ball having a different diameter ball to properly fit a trailer tongue or to replace a damaged hitch ball.

In one aspect, an end of the retention protrusion 464 can terminate within the retention opening 463 (e.g., within the lower portion 462 of the hitch ball 407). In other words, the retention protrusion 464 does not extend all the way through the hitch ball 407 (e.g., through the lower portion 462). In a particular aspect, the retention opening 463 can be a blind opening or hole (e.g., an opening or hole that does not extend all the way through the lower portion 462 of the hitch ball 407). Thus, the retention opening 463 can be a blind opening or a through opening and the retention protrusion 464 may not extend all the way through the hitch ball 407.

Although the retention opening 463 has been shown and described as being associated with the hitch ball 407 and the retention protrusion 464 has been described as being associated with the body portion 460, it should be recognized that retention opening and retention protrusion can be associated with a hitch ball and/or a body portion, in any suitable arrangement or combination, as desired. For example, a retention opening can be associated with a body portion, and a retention protrusion can be associated with a hitch ball (e.g., coupled to the hitch ball, such as threadingly engaged with the hitch ball). In another example, a retention opening and a retention protrusion can be associated with both a hitch ball and a body portion.

Figure 6:
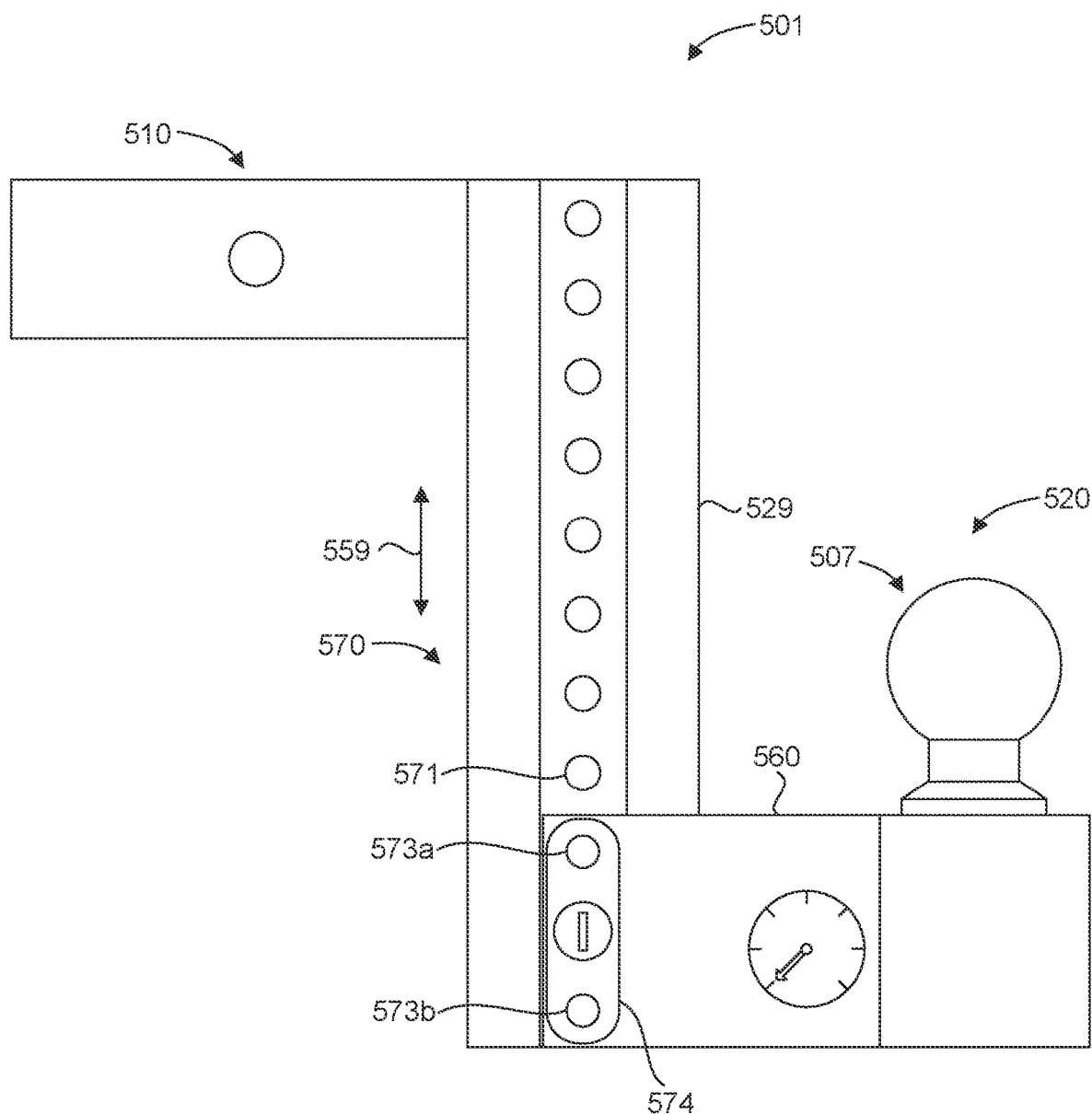
FIG. 6 illustrates a weight measuring hitch ball assembly in accordance with an example of the present disclosure.
Figure 7:
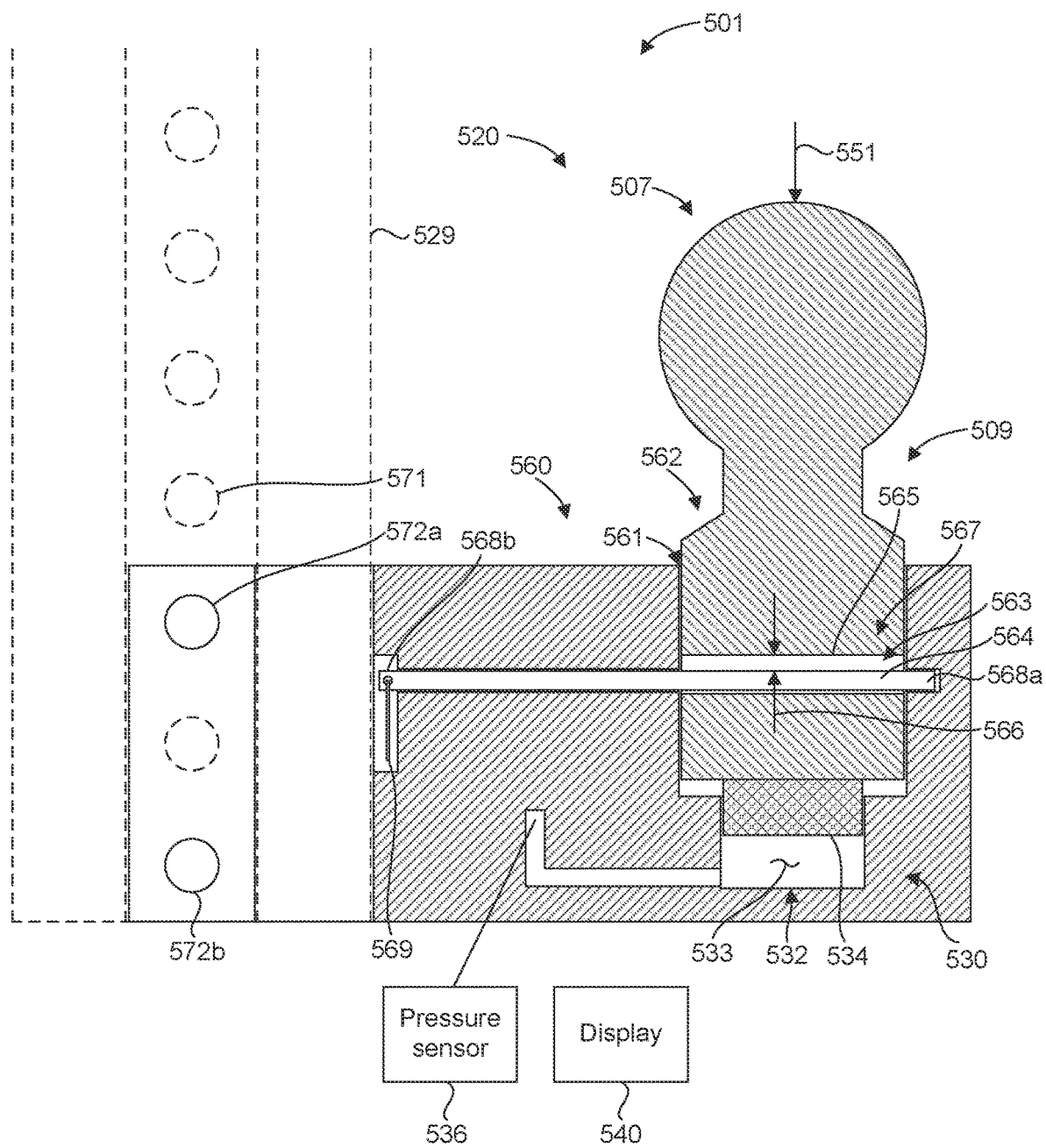
FIG. 7 is a schematic side cross-section detail view of the weight measuring hitch ball assembly of FIG. 6, in accordance with an example of the present disclosure.

FIGS. 6 and 7 illustrate a weight measuring hitch ball assembly 501, in accordance with yet another example of the present disclosure. The weight measuring hitch ball assembly 501 can include a hitch ball 507 configured to engage with a coupling device of the trailer, a load measurement device 530 operable to determine a magnitude of a downward force 551 acting on the hitch ball 507, and a support structure or body portion 560 in support of the hitch ball 507. The body portion 560 can include or define a hitch ball opening or socket 561 to slidably receive a lower portion 562 of the hitch ball 507. The assembly 501 also includes a hitch portion 510 for interfacing with an attachment structure (e.g., a hitch receiver) associated with a vehicle, and a ball portion 520, which can include the hitch ball 507 and the body portion 560.

The load measurement device 530 can comprise any suitable type of load measurement device or mechanism described herein. In the illustrated example, the load measurement device 530 includes a fluid reservoir 532 having a fluid 533, a piston 534, and a display 540 to indicate the magnitude of the load or downward force 551 on the hitch ball 507 based on fluid pressure. The ball portion 520 comprises a trailer tongue weight measuring portion 509 that includes the hitch ball 507 and the load measurement device 530. The present embodiment, however, includes features and structure that facilitate a vertical height adjustment of the ball portion 520. These features can be used, for example, to position the hitch ball 507 at a suitable height for engaging a trailer when a hitch receiver on the tow vehicle would otherwise be too high.

The assembly 501 can include a vertical member 529, coupled between the hitch portion 510 and the ball portion 520, configured to allow adjustment of a height of the ball portion 520 with respect to the hitch portion 510 in direction 559. The hitch ball 510 can therefore include multiple separable components in a height-adjustable device. The height of the ball portion 520 can be adjustable with respect to the hitch portion 510 utilizing a height adjustment mechanism 570. The height adjustment mechanism 570 can include height adjustment openings 571 in the vertical member 529. The height adjustment mechanism 570 can also include two or more height adjustment pin openings 572a, 572b in the ball portion 520. In addition, the height adjustment mechanism 570 can include two or more height adjustment pins 573a, 573b removably extendable at least partially through the height adjustment pin openings 572a, 572b in the ball portion 520 and the height adjustment openings 571 in the vertical member 529. In one aspect, the height adjustment pins 573a, 573b can be coupled to one another via a connecting member 574. The connecting member 574 can therefore facilitate simultaneous insertion or removal of the height adjustment pins 573a, 573b.

In use, the height adjustment pins 573a, 573b can be removed from at least the height adjustment openings 571 in the vertical member 529, and the ball portion 520 can be moved vertically in direction 559. Once a desired height of the hitch ball 507 is achieved, the height adjustment pins 573a, 573b can be inserted into the nearest acceptable adjustment openings 571 through the respective height adjustment pin openings 572a, 572b to fix the relative position of the ball portion 520 and the vertical member 529 and complete the height adjustment of the hitch ball 507.

As with the assembly 401 discussed above, the ball portion 520 of the assembly 501 can include the body portion 560, which can define various features of the load measurement device 530 and can interface with and support the hitch ball 507. In addition, the body portion 560 can be configured to interface with the vertical member 529. For example, the vertical member 529 and the body portion 560 can be configured with complementary geometries to facilitate a stable engagement of the vertical member 529 and the body portion 560 when coupled to one another via the height adjustment pins 573a, 573b, as discussed above. For example, the vertical member 529 can have an I-shaped cross-section and the body portion 560 (i.e., the ball portion 520) can have a C-shaped cross-sectional portion to mate with and engage at least a portion of the I-shaped cross-section of the vertical member 529. Such an interface configuration can provide torsional stability for mating vertical member 529 and ball portion 520 components of the assembly 501. In one aspect, the height adjustment pin openings 572a, 572b can be formed in the body portion 560.

The assembly 501 can be configured to capture the hitch ball 507 to prevent the hitch ball from unwanted separation from the body portion 560 (e.g., capture the hitch ball 507). For example, as shown in FIG. 7, the assembly 501 can include a retention coupling 567 that secures the hitch ball 507 to the body portion 560 while also facilitating slidable movement of the hitch ball 507 within a hitch ball opening 561 of the body portion 560 to determine the magnitude of a force acting on the hitch ball 507. The retention coupling 567 can have a retention protrusion 564 and a retention wall 565 defining at least a portion of a retention opening 563 operable to receive at least a portion of the retention protrusion 564 therein. The retention wall 565 can provide a mechanical barrier to the retention protrusion 564 that prevents removal of the hitch ball 507 from the hitch ball opening 561.

In the illustrated example, the retention opening 563 is associated with the hitch ball 507 (e.g., formed within the lower portion 562 of the hitch ball 507). In one aspect, the retention protrusion 564 can be associated with the body portion 560 (e.g., coupled to the body portion 560). The retention opening 563 can receive the retention protrusion 564 to secure the hitch ball 507 to the body portion 560. For example, the retention protrusion 564 can extend into the retention opening 563. The retention opening 563 and the retention protrusion 564 can be configured to facilitate movement of the hitch ball 507 against the load measurement device 530 in response to the downward force 551 on the hitch ball. For example, an upper clearance 566 between the retention protrusion 564 and the retention wall 565 of the retention opening 563 can be sized equal to or greater than a range of motion or extension distance of the load measurement device 530 (e.g., maximum deflection or piston travel) in response to a maximum allowable force 551 applied to the hitch ball 507. This can ensure that the retention protrusion 564 will not hinder downward movement of the hitch ball 507, which could interfere with a proper measurement of the downward force 551 on the hitch ball 507. The shapes and/or sizes of the retention protrusion 564 and the retention opening 563 can be of any suitable configuration (e.g., cross-sectional shapes that are circular, oval, elliptical, rectangular, etc.), structure (e.g., a notch, groove, channel, hole, etc.), or dimension. For example, the retention protrusion 564 can comprise at least one of a pin, a bolt, a screw, a rod, a shaft, a tab, a flange, or a ball. In one aspect, the retention protrusion 564 and retention opening 563 can have any suitable positional relationship with the associated hitch ball 507 and body portion 560.

In one aspect, an end 568a of the retention protrusion 564 can extend through the retention opening 563 (e.g., within the lower portion 562 of the hitch ball 507). In other words, the retention protrusion 564 does not terminate within the retention opening 563 but extends all the way through the hitch ball 507 (e.g., through the lower portion 562). In this case, the end 568a of the retention protrusion 564 can terminate in the body portion 560. Thus, the retention opening 563 can be a through opening and the retention protrusion 564 may extend all the way through the hitch ball 507 and into the body portion 560 on either side of the hitch ball 507.

Although the retention opening 563 has been shown and described as being associated with the hitch ball 507 and the retention protrusion 564 has been described as being associated with the body portion 560, it should be recognized that retention opening and retention protrusion can be associated with a hitch ball and/or a body portion, in any suitable arrangement or combination, as desired. For example, a retention opening can be associated with a body portion, and a retention protrusion can be associated with a hitch ball (e.g., coupled to the hitch ball, such as threadingly engaged with the hitch ball). In another example, a retention opening and a retention protrusion can be associated with both a hitch ball and a body portion.

In one aspect, the retention protrusion 564 can be accessible from an exterior of the body portion 560 to facilitate removal of the retention protrusion and, thus, the hitch ball 507. The hitch ball 507 can therefore be interchanged with another hitch ball having a different diameter ball to properly fit a trailer tongue or to replace a damaged hitch ball. As mentioned above, the body portion 560 can be configured to interface with the vertical member 529, which is attached to or otherwise associated with the hitch portion 510. Thus, the body portion 560 can be removably coupled to the vertical member 529 and the hitch portion 510. In one aspect, when the body portion 560 and the hitch portion 510 are coupled to one another (e.g., via the vertical member 529), the retention protrusion 564 can be hidden from view. On the other hand, when the body portion 560 and the hitch portion 510 are separated from one another (e.g., the body portion 560 is removed from the vertical member 529), the retention protrusion 564 can be exposed to facilitate removal from the retention opening 563. For example, the retention protrusion 564 can be oriented with an end 568*b* of the pin proximate the vertical member 529, such that the retention protrusion is hidden from view when the ball portion 520 is coupled to the vertical member. This can provide a "clean" look for the assembly 501 that is aesthetically pleasing compared to an "exposed" pin. The retention protrusion 564 can be accessible upon separating the ball portion 520 from the vertical member 529. A ring 569 or other suitable grasping feature can facilitate removal of the pin 564 from the ball portion (i.e., the body portion 560) to replace or interchange the hitch ball 507.

Figure 8A:
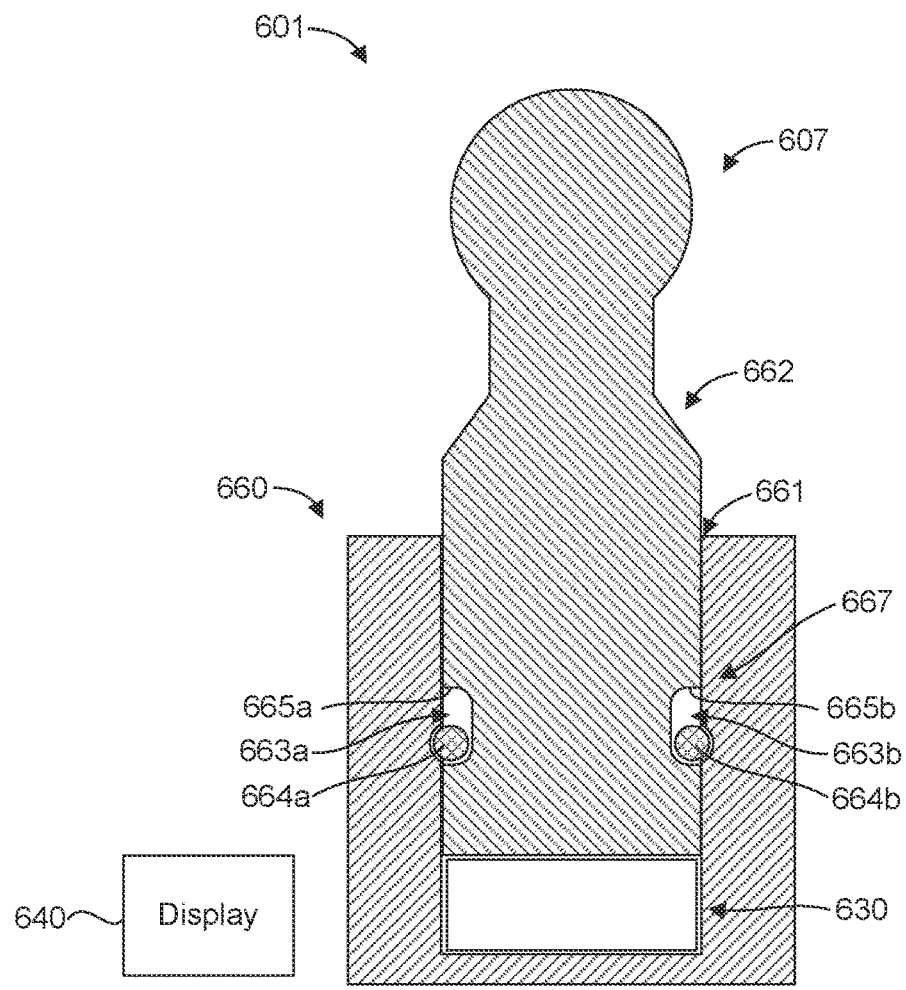
FIG. 8A is a schematic side cross-section view of a weight measuring hitch ball assembly in accordance with an example of the present disclosure.
Figure 8B:
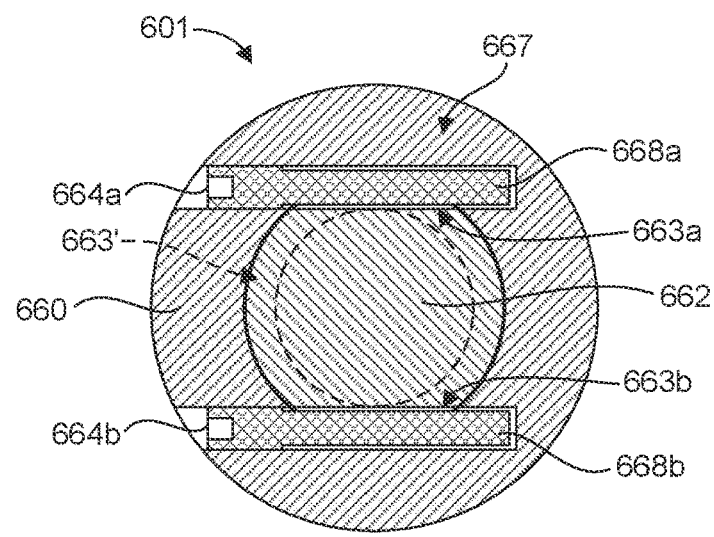
FIG. 8B is a schematic top cross-section view of the weight measuring hitch ball assembly of FIG. 8A, in accordance with an example of the present disclosure.

FIGS. 8A and 8B illustrate a weight measuring hitch ball assembly 601 in accordance with an example of the present disclosure. The weight measuring hitch ball assembly 601 can include a hitch ball 607 configured to engage with a coupling device of the trailer, a load measurement device 630 operable to determine a magnitude of a downward force acting on the hitch ball 607, and a support structure or body portion 660 in support of the hitch ball 607. The body portion 660 can include or define a hitch ball opening or socket 661 to slidably receive a lower portion 662 of the hitch ball 607. The load measurement device 630 can comprise any suitable type of load measurement device or mechanism described herein. In one aspect, a display 640 for the load measurement device 630 can be included to indicate the magnitude of the load or downward force acting on the hitch ball 607. The display 640 can be of any suitable type or configuration disclosed herein and can be disposed in any suitable location. The assembly 601 can be adapted to couple or interface with any suitable attachment structure, as disclosed herein, to facilitate coupling the weight measuring hitch ball assembly 601 to a tow vehicle.

The assembly 601 can be configured to capture the hitch ball 607 to prevent the hitch ball from unwanted separation from the body portion 660. For example, as shown in FIGS. 8A and 8B, the assembly 601 can include a retention coupling 667 that secures the hitch ball 607 to the body portion 660 while also facilitating slidable movement of the hitch ball 607 within a hitch ball opening 661 of the body portion 660 to determine the magnitude of a force acting on the hitch ball 607. The retention coupling 667 can have a retention protrusion 664*a-b* and a retention wall 665*a-b* defining at least a portion of a retention opening 663*a-b* operable to receive at least a portion of the retention protrusion 664*a-b* therein. The retention wall 665*a-b* can provide a mechanical barrier to the retention protrusion 664*a-b* that prevents removal of the hitch ball 607 from the hitch ball opening 661.

In the illustrated example, one or more of the retention openings 663*a-b* is associated with the hitch ball 607 (e.g., formed within the lower portion 662 of the hitch ball 607). In addition, one or more of the retention protrusions 664*a-b* is associated with the body portion 660 (e.g., coupled to the body portion 660). The retention protrusions 664*a-b* can be threadingly engaged with the body portion, press-fit into the body portion 660, welded to body portion 660, etc. Each of the retention openings 663*a-b* can receive at least one of the retention protrusions 664*a-b* to secure the hitch ball 607 to the body portion 660. For example, the retention protrusions 664*a-b* can extend into the respective retention openings 663*a-b*. The retention openings 663*a-b* and the retention protrusions 664*a-b* can be configured to facilitate movement of the hitch ball 607 against the load measurement device 630 in response to the downward force on the hitch ball. For example, an upper clearance between the retention protrusions 664*a-b* and the retention walls 665*a-b* of the retention openings 663*a-b* can be sized equal to or greater than a range of motion of the load measurement device 630 (e.g., maximum movement of the hitch ball 607) in response to a maximum allowable force applied to the hitch ball 607. This can ensure that the retention protrusions 664*a-b* will not hinder downward movement of the hitch ball 607, which could interfere with a proper measurement of the downward force on the hitch ball 607. The shapes and/or sizes of the retention protrusions 664*a-b* and the retention openings 663*a-b* can be of any suitable configuration (e.g., cross-sectional shapes that are circular, oval, elliptical, rectangular, etc.), structure (e.g., a notch, groove, channel, hole, etc.), or dimension. For example, the retention protrusions 664*a-b* can comprise at least one of a pin, a bolt, a screw, a rod, a shaft, a tab, a flange, or a ball. In addition, the retention openings 663*a-b* and the retention protrusions 664*a-b* can be included in any suitable quantity and in any suitable location or pattern.

The retention protrusions 664*a-b* and retention openings 663*a-b* can have any suitable relationship with the associated hitch ball 607 and body portion 660. In one aspect, as shown in FIGS. 8A and 8B, at least two of the retention protrusions 664*a-b* (and/or retention openings 663*a-b*) can be oriented parallel to one another. In another aspect, one or more of the retention protrusions 664*a-b* (and/or retention openings 663*a-b*) can be oriented tangential to an outer periphery of the lower portion. In this case, the retention openings 663*a-b* can be open on at least one end and a lateral side. In one aspect, as shown in the illustrated example, ends 668*a-b* of the retention protrusions 664*a-b* can extend all the way through the hitch ball 607 (e.g., through the retention openings 663*a-b* and the lower portion 662) and terminate within the body portion 660. In one aspect, as illustrated in FIG. 8B, a retention opening 663' can extend about an outer periphery of the lower portion 662. In this case, one or more tangentially located and oriented retention protrusions 664*a-d* can extend into the (single) retention opening 663'. Such a configuration can enable relative rotation between the hitch ball 607 and the body portion 660.

In one aspect, ends of the retention protrusions 664*a-b* can terminate within the retention openings 663*a-b* (e.g., within the lower portion 662 of the hitch ball 607). In other words, the retention protrusions 664*a-b* do not extend all the way through the hitch ball 607 (e.g., through the lower portion 662). In a particular aspect, one or more of the retention openings 663*a-b* can be blind openings or holes (e.g., openings or holes that do not extend all the way through the lower portion 662 of the hitch ball 607). Thus, one or more of the retention openings 663*a-b* can be blind openings or through openings and the retention protrusions 664*a-b* may not extend all the way through the hitch ball 607.

Although the retention openings 663*a-b* have been shown and described as being associated with the hitch ball 607 and the retention protrusions 664*a-b* have been shown and described as being associated with the body portion 660, it should be recognized that retention openings and retention protrusions can be associated with a hitch ball and/or a body portion, in any suitable arrangement or combination, as desired. For example, retention openings can be associated with a body portion, and retention protrusions can be associated with a hitch ball (e.g., coupled to the hitch ball, such as threadingly engaged with the hitch ball). In another example, retention openings and retention protrusions can be associated with both a hitch ball and a body portion.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A weight measuring hitch ball assembly, comprising:
   a hitch ball having a ball and a lower portion;
   a body portion defining a hitch ball opening that slidably receives the lower portion of the hitch ball;
   a load measurement device operably associated with the body portion and the hitch ball to determine a magnitude of a force acting on the hitch ball; and
   a retention coupling operable with the hitch ball and the body portion to secure the hitch ball to the body portion, the retention coupling having a retention protrusion and a retention wall defining at least a portion of a retention opening operable to receive at least a portion of the retention protrusion therein,
   wherein, with the retention protrusion extending into the retention opening, the retention wall provides a mechanical barrier to the retention protrusion that prevents removal of the hitch ball from the hitch ball opening, and
   wherein either the lower portion of the hitch ball, or the retention opening, is configured to facilitate slidable movement of the hitch ball within the hitch ball opening sufficient to determine the magnitude of the force acting on the hitch ball;
   wherein either:
      the retention opening is formed in the lower portion of the hitch ball; or
      the retention protrusion extends into the retention opening and an end of the retention protrusion terminates within the retention opening; or
      the retention opening comprises a plurality of retention openings and the retention protrusion comprises a plurality of retention protrusions, each of the plurality of retention openings receiving at least one of the plurality of retention protrusions.

2. The weight measuring hitch ball assembly of claim 1, wherein the retention opening is associated with the hitch ball or the body portion, and the retention protrusion is associated with the other of the hitch ball or the body portion.

3. The weight measuring hitch ball assembly of claim 2, wherein the retention opening is threadingly engaged with the hitch ball or the body portion.

4. The weight measuring hitch ball assembly of claim 1, wherein the retention opening is formed in the lower portion of the hitch ball.

5. The weight measuring hitch ball assembly of claim 1, wherein the retention opening is formed in the body portion.

6. The weight measuring hitch ball assembly of claim 1, wherein the retention protrusion extends into the retention opening and an end of the retention protrusion terminates within the retention opening.

7. The weight measuring hitch ball assembly of claim 1, wherein the retention protrusion terminates within the lower portion of the hitch ball.

8. The weight measuring hitch ball assembly of claim 1, wherein the retention opening comprises a blind opening.

9. The weight measuring hitch ball assembly of claim 1, wherein the retention opening comprises a through opening.

10. The weight measuring hitch ball assembly of claim 1, wherein the retention protrusion is oriented toward a center of the hitch ball.

11. The weight measuring hitch ball assembly of claim 1, wherein the retention opening extends about an outer periphery of the lower portion.

12. The weight measuring hitch ball assembly of claim 1, wherein the retention protrusion is oriented tangential to an outer periphery of the lower portion.

13. The weight measuring hitch ball assembly of claim 1, wherein the retention protrusion comprises at least one of a pin, a bolt, a screw, a rod, a shaft, a tab, a flange, or a ball.

14. The weight measuring hitch ball assembly of claim 1, wherein the retention opening comprises a plurality of retention openings and the retention protrusion comprises a plurality of retention protrusions, each of the plurality of retention openings receiving at least one of the plurality of retention protrusions.

15. The weight measuring hitch ball assembly of claim 14, wherein at least two of the retention protrusions are oriented parallel to one another.

16. The weight measuring hitch ball assembly of claim 15, wherein at least two of the retention protrusions are aligned with one another.

17. The weight measuring hitch ball assembly of claim 14, wherein at least two of the retention protrusions are oriented perpendicular to one another.

18. The weight measuring hitch ball assembly of claim 1, further comprising a hitch portion removably coupleable to the body portion, the hitch portion being configured to interface with an attachment structure associated with a tow vehicle to facilitate coupling the weight measuring hitch ball assembly to the tow vehicle, wherein, when the body portion and the hitch portion are coupled to one another, the retention protrusion is hidden from view and, when the body portion and the hitch portion are separated from one another, the retention protrusion is exposed to facilitate removal from the retention opening.

19. A trailer hitch system, comprising:
   the weight measuring hitch ball assembly of claim 1 operably coupled to a tow vehicle.

20. A method of measuring weight of a trailer supported by a tow vehicle, comprising:
   operably coupling the weight measuring hitch ball assembly of claim 1 to a tow vehicle; and
   engaging a coupling device of a trailer with the weight measuring hitch ball assembly.

* * * * *